United States Patent [19]

Durand et al.

[11] 4,212,704

[45] Jul. 15, 1980

[54] COMPOSITION AND PRODUCTION PROCESS FOR FOURDRINIER FIBERBOARD

[75] Inventors: Harry W. Durand; Richard D. Bunker, both of Muscatine, Iowa

[73] Assignee: Grain Processing Corporation, Muscatine, Iowa

[21] Appl. No.: 566,973

[22] Filed: Apr. 10, 1975

Related U.S. Application Data

[63] Continuation of Ser. No. 352,561, Apr. 19, 1973, abandoned, which is a continuation-in-part of Ser. No. 76,310, Sep. 28, 1970, abandoned, which is a continuation-in-part of Ser. No. 807,941, Mar. 17, 1969, abandoned, which is a continuation-in-part of Ser. No. 697,634, Jan. 15, 1968, abandoned.

[51] Int. Cl.$^2$ .......................................... D21H 3/28
[52] U.S. Cl. ................................. 162/175; 162/152; 162/183
[58] Field of Search .............. 162/158, 175, 152, 155, 162/183; 260/233.3 R, 233.3 A; 127/70, 71; 536/110

[56] References Cited

U.S. PATENT DOCUMENTS

| | | | |
|---|---|---|---|
| 2,103,318 | 12/1937 | Clapp | 162/175 |
| 2,197,463 | 4/1940 | Bradner | 162/175 |
| 2,461,139 | 2/1949 | Caldwell | 260/233.5 |
| 2,853,484 | 9/1958 | Lolkema et al. | 260/223.5 |
| 3,069,411 | 12/1962 | Hjermstad | 162/175 |
| 3,243,340 | 3/1966 | Cadotte | 162/135 |
| 3,640,925 | 2/1972 | Touzinski et al. | 162/175 |
| 3,644,332 | 2/1972 | Mooth et al. | 260/233.5 |

OTHER PUBLICATIONS

"The Dict. of Paper", 2nd Ed. (1951), Amer. Pulp & Paper Assoc., pp. 133, 180, 181, 262.

*Primary Examiner*—S. Leon Bashore
*Assistant Examiner*—Peter Chin
*Attorney, Agent, or Firm*—Lowe, Kokjer, Kircher, Wharton & Bowman

[57] ABSTRACT

In a fiberboard composed of fibers bound together with a starch derivative produced by reacting maleic, phthalic, or succinic anhydride, or a combination of these anhydrides, with starch, an improvement in the Fourdrinier process for producing said fiberboard wherein the reaction product of the anhydride and starch is directly mixed, without drying, with fiber and other conventional ingredients, such as clay, and is then passed directly to the Fourdrinier machine.

2 Claims, No Drawings

COMPOSITION AND PRODUCTION PROCESS FOR FOURDRINIER FIBERBOARD

This application is a continuation of our copending application Ser. No. 352,651, filed Apr. 19, 1973 abandoned, which is a continuation-in-part of our application Ser. No. 76,310, filed Sept. 28, 1970, now abandoned, which is a continuation-in-part of our application Ser. No. 807,941, filed Mar. 17, 1969, now abandoned, which in turn is a continuation-in-part of our application Ser. No. 697,634, filed Jan. 15, 1968, now abandoned.

BACKGROUND AND SUMMARY OF THE INVENTION

This invention relates to an improved composition for Fourdrinier fiberboard and additionally to an improvement in the Fourdrinier process of fabrication.

Fiberboard has a wide application, for example, as acoustical ceiling tile. For this purpose, it has particularly good sound attenuating properties and has an attractive appearance. In addition to acoustical applications, fiberboard is also typically employed for heat insulating and flame barriers, wall panels, and the like.

Fiberboard is normally manufactured in accordance with one of two basic fabrication techniques. One process, known as the cast method, involves essentially essentially blending a fibrous material with a heavy bodied starch-water paste, casting or spreading the mixture out in slab form, and subsequently kiln drying. The other manufacturing method, to which this invention particularly relates, is known as the Fourdrinier process.

The general Fourdrinier technique as referred to herein involves the use of a Fourdrinier or cylinder screen machine of the type generally found in the paper manufacturing industry, or similar equipment having the purpose of extracting water from a fiber slurry such as under vacuum. Applying such Fourdrinier method, a relatively thin slurry comprising water, starch binder and mineral fiber, with flocculent sometimes added, is felted onto the screen machine, most of the water is withdrawn, and the sheet is then heat dried. The heat gelatinizes the starch into the adhesive in situ, thus forming what is generally referred to as "felted" board.

Although various starchy materials can be used as binder, a highly desirably one from various viewpoints has been tapicoa starch since, among other factors, it has a low gelatinization temperature and gives a rapid increase in viscosity after gelatinization temperature is reached. This rapid increase in viscosity, or in other words, this ability of the starch to paste quickly is conductive to effective bonding. Tapioca starch is, however, an imported product and is subject to fluctuation in supply, quality, uniformity and cost.

One object of this invention is to provide a fiberboard composition adapted for the Fourdrinier process using other than unmodified tapioca starch as a binder and which possesses satisfactory sag and strength properties.

Another object of this invention is to provide a Fourdrinier fiberboard composition in which the binder has little or no tendency to migrate.

Still another object of the invention is to provide a Fourdrinier fiberboard composition containing a starch binder having a low gelatinization temperature.

An additional object of the invention is to provide a Fourdrinier fiberboard composition containing a starch binder which reaches its maximum aqueous viscosity at a relatively low temperature.

Yet another object of the invention is to provide a Fourdrinier fiberboard composition containing a starch binder having a relatively high maximum viscosity.

A further object of the invention is to provide an improvement in the Fourdrinier machine process for making fiberboard through which a much better dispersion of the binder in the board is achieved with attendant increases in strength and related properties.

Yet a further object of the invention is to provide an improvement in the Fourdrinier machine process for making fiberboard whereby starches much lower in purity than heretofore thought suitable can now be satisfactorily employed.

Other and further objects of the invention, together with the features of novelty appurtenant thereto, will appear in the course of the following description.

DESCRIPTION OF THE INVENTION

Unless otherwise noted, percentages and proportions given herein are based on weight and viscosities are given in Brabender Units.

A. Fourdrinier fiberboard composition

In accordance with the first aspect of our invention, the fiberboard composition useful for the Fourdrinier process is comprised of fibers bound together with a starch derivative produced by reacting a starch with a dibasic anhydride. The starch derivative facilitates the practice of the Fourdrinier process and imparts superior structural qualities to the finished fiberboard. Conventional additives and fillers can also be incorporated, depending upon the desires of the manufacturer.

Starches suitable for modification with a dibasic anhydride include wet milled corn, dry milled corn, wheat, potato, and tapioca starches. It will be understood that starches characterized as whole, unmodified and/or ungelatinized are to be employed as initial constituents in the composition and improved Fourdrinier method taught herein.

The dibasic anhydrides suitable for use in reacting with such starch include maleic anhydride, phthalic anhydride, succinic anhydride, or a combination of two or more such anhydrides in varying amounts. The amount of anhydride reacted with the starch can be varied considerably to affect the properties of the starch. Research thus far completed indicates a satisfactory working range from 0.05% to 6.0% anhydride based on dry starch, with a range of 0.5% to 4.0% seeming to have the best commercial practicability.

The dibasic anhydride modified starch can be obtained by procedures similar to the method related to maleic anhydride modified starch as described in U.S. Pat. No. 2,461,139 by Caldwell, incorporated by reference herein. Essentially, this method involves adjusting the pH of a starch-water slurry to between approximately 7 and 11 with a suitable alkali while vigorously stirring. With the system under rapid agitation, a specific amount of anhydride is added at such a rate as to permit the pH to be maintained in the specified range by means of simultaneous addition of aqueous alkali. The quantity of anhydride added is based upon the degree of acylation desired and may be adjusted to change the properties of the resultant starch.

The reaction is carried out in the temperature range of 70° to 130° F., with a range of 80° to 115° F. being preferred.

In the fiberboard manufacture, various fibers may be employed. Although mineral fibers are most commonly used in the fiberboard industry, the modified starches herein are applicable as well to boards or panels made up of other fibers, such as cellulosic, synthethic, or metallic fibers. Likewise conventional additives known to those in this art, such as clay and flocculents, may be added. Although various levels of clay addition have been tried, clay in the amount of 10 to 20% based on the total weight of the board seems to provide the best overall properties.

Various levels of concentrations of binder additions have been experimented with, and it has been found that from 6 to 15% by weight of the modified starch binder, based on the total solids weight of the board, produces a board with the best overall properties. The ratio between the binder and the clay or other fillers, if used, can be varied depending upon what properties, board weight, and the like are desired.

Turning now to an examination of the aforementioned characteristics, the following Table I presents typical pasting properties for wet milled corn starch at various levels of acylation of starch modified with maleic anhydride.

Table I
CONCENTRATION EFFECT ON BRABENDER AMYLOGRAPHIC PROPERTIES (8.0% Solids)[1]

| Maleic Anhydride Addition Level | Gelatiniz. t° C. | Peak Viscosity @t° C.[2] | Cookout Viscosity @95° C.[2] | |
|---|---|---|---|---|
| | | | Initial. | 30 Min. |
| None (control) | 72 | 720@94 | 710 | 540 |
| 0.12 | 71-2 | 910@94.5 | 910 | 910 |
| 0.36 | 71-2 | 1115@92 | 1110 | 1170 |
| 0.60 | 71-2 | 1310@89 | 1200 | 1110 |
| 1.20 | 68 | 1575@83 | 1185 | 640 |
| 2.40 | 64.5 | 2250@74 | 1150 | 710 |
| 3.60 | 56 | 2780@68.5 | 1120 | 725 |
| 4.80 | 50 | 2840@65.5 | 1090 | 770 |
| 6.00 | 40 | 3540@60 | 1190 | 770 |

Notes:
[1] 8.0% solids content in modified starch
[2] Viscosities given in Brabender Units As noted in the table headings, the Brabender Amylograph has been used for the starch evaluation. This instrument is a continuously recording device used to measure and record the resistance to shear of a starch slurry through a course of heating and cooling under relatively uniform conditions. That is to say, for the purposes of arriving at the data shown in Table I, the temperature of the slurry is gradually raised at a constant rate until reaching 95° C., where it is maintained for 30 minutes. The temperature at which a measurable so-called "viscosity" is first observed is referred to as the gelatinization temperature. This temperature approximates the temperature at which the individual starch granules first begin to swell and lose their birefringence under polarized light.

As the temperature of the mixture continues to rise above the gelatinization temperature, the viscosity also rises until it reaches a peak value and then usually drops off. This aforesaid thickening process is referred to as "pasting". The peak viscosity values and the temperatures at which they occur, as taken from the Brabender curves, are thus recorded in Table I. The cook-out viscosities, which are also recorded in Table I, refer to the paste behavior after the mixture reaches 95° C. and has been maintained at such temperature for 30 minutes.

Referring therefore to Table I, we have found that starches having a maleic anhydride addition level of 1.0% and above are best suited for compositions used in the Fourdrinier process since the starch binder has a low gelatinization temperature and an increase in peaking viscosity with concomitant decrease of peaking temperature. The rapid increase in viscosity as the gelatinization temperature is reached, earlier referred to as a rapid pasting or rate of cook-out, provides the best bonding for the Fourdrinier process.

The following Table II presents a study of the effect on amylographic properties of unary, binary, and trinary systems of dibasic anhydride at a fixed level of addition, namely 3% by weight. The starch employed in these tests was unmodified pearl corn starch which was slurried to 40% solids in water and the pH was adjusted to approximately 8.5 with a 3% NaOH solution before the addition of anhydride. As the anhydride was added to the starch slurry, the 3% NaOH solution was simultaneously added to maintain the pH in the range of 7.5 to 8.5. These reactions were conducted in the temperature range of 80° to 115° F. depending on the anhydride used and the combinations thereof.

Table II
DIBASIC ACYLATION OF CORN STARCH BY REACTION WITH A 3% CONCENTRATION OF MALEIC, PHTHALIC OR SUCCINIC ANHYDRIDE OR COMBINATION THEREOF

| Anhydride Addition (g/100g dry starch) | | | Gelatiniz. Temp. (°C.) | Peak Viscosity @t °C. | Brabender Amylographic Properties at 8.0% Solids | |
|---|---|---|---|---|---|---|
| | | | | | Cookout Viscosity @95° C. | |
| Maleic | Phthalic | Succinic | | | Initial | 30 Min. |
| Unmodified Starch | | | 70 | 685(86) | 645 | 580 |
| 3 | — | — | 52 | 3080(70.5) | 1100 | 700 |
| — | 3 | — | 61 | 2660(75) | 790 | 475 |
| — | — | 3 | 59 | 2580(72) | 820 | 560 |
| 1 | 2 | — | 58 | 2590(72) | 940 | 610 |
| 2 | 1 | — | 56 | 2880(72) | 1050 | 650 |
| 1.5 | 1.5 | — | 60 | 2540(72.5) | 970 | 620 |
| 1 | — | 2 | 58.5 | 2650(71) | 850 | 575 |
| 2 | — | 1 | 55 | 2700(71) | 1020 | 675 |
| 1.5 | — | 1.5 | 56.5 | 2450(71.5) | 920 | 620 |
| — | 1 | 2 | 59 | 2435(72) | 760 | 520 |
| — | 2 | 1 | 60 | 2380(74) | 785 | 495 |
| — | 1.5 | 1.5 | 59 | 2540(74) | 840 | 575 |
| 1 | 1 | 1 | 60 | 2590(71.5) | 900 | 600 |
| 1 | 0.5 | 1.5 | 57.5 | 2670(73) | 900 | 590 |
| 1 | 1.5 | 0.5 | 58 | 2500(73) | 910 | 610 |
| 0.5 | 1 | 1.5 | 56.5 | 2750(73) | 900 | 580 |
| 1.5 | 1 | 0.5 | 54 | 2460(72.5) | 950 | 610 |
| 0.5 | 1.5 | 1 | 57 | 2530(73) | 950 | 610 |
| 1.5 | 0.5 | 1 | 56.5 | 2780(71.5) | 990 | 630 |

The foregoing results in Table II yield useful guidelines in selecting the parameters for any specific formulation of fiberboard to be carried out using the Fourdrinier process. For example, when reduction of gelatinization temperature is of primary importance, maleic anhydride would be a favored selection over succinic which, in turn, would be favored over phthalic for modification of the starch. Similarly, if increase in peak viscosity is desired, then maleic would be preferable to succinic, and succinic would be preferable to phthalic. In reduction of peaking temperature, maleic would be preferable to succinic which, in turn, would be preferable to phthalic. However, for increase in cook-out viscosity, then phthalic would be preferable to succinic and succinic would be preferable to maleic.

There are two major factors aside from cost that determine the suitability of any binder. These are the binder effectivity (i.e., the breaking strength of the finished board at a given binder level) and the sag resistance (i.e. the ability of the board to withstand gravity-induced deformation in a warm, humid atmosphere). The following Table III contains data comparing maleated corn starch with two standards; namely, tapioca starch and unmodified corn starch. As indicated, the maleated starch is at least as good, if not superior, in these respects when compared to a tapioca starch product, and produces a far better fiberboard than one bound with unmodified corn starch. In each case, the fiber used was entirely mineral wool and the boards were prepared by the Fourdrinier fabrication procedure, TAPPI Standard T1001 m-60, and were finished 8" circular, thickness ⅜". Testing procedures were ASTM designation (367-57) with minor differences.

ents a comparison of properties obtained from the starches with and without modification by maleic anhydride.

Table IV

| | COMPARISON OF MODIFIED STARCHES | | | | | |
|---|---|---|---|---|---|---|
| | | | | | Cookout Viscosity (B.U.) at 95° C. | |
| Starch type | Degree of maleation | Paste solids | Gelatiniz. Temp(°C.) | Peak Viscosity, B.U. | Initial | After 30 Min. |
| Potato | 0.00 | 5.0 | 65 | 1290 | 1140 | 620 |
|  | 0.018 |  | 56 | 2170 | 970 | 700 |
| Tapioca | 0.00 | 8.0 | 68 | 505 | 270 | 90 |
|  | 0.018 |  | 64.5 | 1630 | 980 | 610 |
| Dry-milled corn | 0.00 | 8.0 | ca. 72 | 375 | 365 | 260 |
|  | 0.0147 |  | ca. 69 | 850 | 680 | 550 |

From the foregoing, it is observed that modification with a dibasic anhydride enhances the properties of various starches for better adaptation to the Fourdrinier process.

B. Improvement for the Fourdrinier process

The second aspect of our invention relates to an improvement in the Fourdrinier process of manufacturing fiberboard. It should be understood that any of the various fiberboard formulations disclosed in the first aspect of our invention may be advantageously employed in practicing the improved Fourdrinier process now to be disclosed.

In the conventional Fourdrinier machine process, the starch binder is supplied in a dry form. However, on arriving at the fiberboard plant, the dry starch must be put into a slurry form to ensure proper mixing with the Table III

| | STRENGTH COMPARISON OF FOURDRINIER FIBERBOARD | | | |
|---|---|---|---|---|
| Starch Binder | % Starch based on fiber weight | % Clay based on fiber weight | Modulus of rupture psi | Sag, inches/24 hrs. at 90% Rel. Hum. |
| Maleated corn starch (1.5%) | 8 | 20 | 200.8 | 0.017 |
| Tapioca Starch | 8 | 20 | 172.1 | 0.016 |
| Unmodified corn starch | 8 | 20 | 98.3 | 0.035 |

The modulus of rupture shown was determined from the breaking strength of individual test specimens cut from prepared board, and was calculated with the following equation.

$$M/R = \frac{3\,[\,(\text{load})\,(\text{span})\,]}{2\,[\,(\text{width})\,(\text{caliper}^2)\,]}$$

Where:
M/R = Modulus of rupture
load = Breaking force in pounds
span = Length of supported sample
width = Width of sample
caliper = Thickness of sample The sag was determined by averaging a plurality of readings taken on specimens supported in a humid environment for 24 hours.

It should be apparent that the individual readings reported above are merely representative since the results vary somewhat with changes in percentages of starch and clay and on the particular grade of binder. Also, the amount of anhydride reacted with the starch can be varied considerably, and as we have shown, has effect on the properties of the starch.

Although wet milled corn starch is used extensively herein for modification, due to its availability and reasonable cost, it is also possible to modify other starches with a dibasic anhydride. The following Table IV presfibers and other ingredients. In this connection, experience with dry starches has taught that it is difficult to create an evenly dispersed slurry of the fiberboard ingredients, and there is great likelihood of globs and lumps of binder in the mixture which must be removed or broken up to create a satisfactory slurry.

Due to their pasting properties, as described above, the dibasic anhydride derivatives of starch can be used advantageously in Fourdrinier fiberboard production. In conjunction with these modified starches, and as an improvement in the Fourdrinier process, we have found that not only is the difficulty of making the slurry solved, but also that properties of the finished board are improved if the modified starch is not reduced to a dry form at the conclusion of its manufacture. But rather, a superior fiberboard is achieved if the modified starch is used directly in its reaction slurry form. In other words, the slurry product formed by the starch-anhydride reaction is directly combined with fiber and clay, and this mixture is then fed to the Fourdrinier machine, resulting in a superior fiberboard at a reduction in cost of the starch derivative. It will be understood by those skilled in this art that the drying operation employing conventional Fourdrinier principles raises the temperature of the fiberboard above the gelatinization temperature of the ungelatinized starch reaction slurry in order to effect bonding.

Thus, the starch-anhydride reaction can be advantageously carried out at the fiberboard plant. Furthermore, this method of modification toward reduced gelatinization temperature and generally improved properties for application in fiberboard manufacture is applicable to starches in general. Consequently, starches of lower purity than heretofore thought suitable for fiberboard production can thereby be upgraded and now employed for increased savings in manufacturing costs.

The following examples present a comparison study of the dry form versus the slurry form of modified starch derived using both maleic, phthalic and succinic anhydrides.

EXAMPLE 1

Enough unmodified, whole corn starch suspension containing 40% solids was taken to equal approximately 1200 grams of dry solids. This slurry was heated to between 110° and 115° F., after which the pH was adjusted to 8.5 using 3% NaOH solution. Next, 30 grams of maleic anhydride (2½% by weight of the starch solids) was added in small doses while 3% NaOH solution was simultaneously added at such a rate as to maintain the pH between 7.5 and 8.5. After completion of the reaction (approximately ½ hour), the slurry was divided into two parts. The pH of one part was adjusted to 5.7 using sulphuric acid and the pH of the other part was also adjusted to 5.7, but using alum. Each mixture was then filtered, washed with water, and oven dried at approximately 230° F. until the finished moisture content of each product was approximately 10 to 12%. A specimen fiberboard was then made with each product.

For the fabrication of the Fourdrinier fiberboard, 11.2 grams (dry basis) of the dry modified starch was added with 105 grams of mineral wool and 25.2 grams of clay into 5 liters of water and mixed in a Lightnin mixer for one half hour. Toward the end of the mixing a flocculent was added; in this case, 40 ml. of a 1% solution of Nalco 634. Upon removal from the mixer, the water was screened from the solids by pouring the mass onto a laboratory hand sheet form. The mass was then pressed to a uniform thickness (½") and oven dried.

EXAMPLE 2

Maleic anhydride and starch were reacted according to the reaction procedure given in Example 1. After completion of the reaction, the slurry was divided into two parts. The pH of one part was adjusted to 5.7 using sulphuric acid and the pH of the other part was adjusted to 5.7 using alum. Instead of filtering, washing and drying each mixture as described in Example 1, these steps were omitted and the product was left in slurry form. A specimen fiberboard was then made with each slurry product.

For the fabricaton of the Fourdrinier fiberboard, 105 grams of mineral wool and 25.2 grams of clay were added to a slurry portion having 11.2 grams (dry basis) of starch. The modified starch, clay, wool and the flocculent were added, thoroughly mixed, and the board was formed as in Example 1.

EXAMPLE 3

Enough corn starch suspension containing 40% solids was taken to equal approximately 1200 grams of dry solids. This slurry was heated to between 110° and 115° F., after which the pH was adjusted to 9.0 using 3% NaOH solution. Next, 30 grams phthalic anhydride (2½% by weight of the starch solids) was added. The pH of the slurry was permitted to drift down to 7.5, at which time 3% NaOH solution was added to adjust the pH to 9.0. The pH was then allowed to again drift to 7.5 and was then upwardly adjusted with caustic to 9.0, and this procedure was repeated until there was a substantial increase in the time needed for the slurry to drift from a pH of 9.0 back down to 7.5. This increase in time signaled the end of the reaction and the slurry was divided into two parts. The pH of the one part was adjusted to 5.7 using sulphuric acid and the pH of the other part was adjusted to 5.7 using alum. Each mixture was then filtered, washed with water, and oven dried at approximately 230° F. until the finished moisture content of each product was approximately 10 to 12%. A specimen fiberboard using each product was then made by the same fabrication procedure as given in Example 1.

EXAMPLE 4

Phthalic anhydride and starch were reacted according to the reaction procedure given in Example 3. After completion of the reaction, the slurry was divided into two parts. The pH of one part solution was adjusted to 5.7 using sulphuric acid and the pH of the other part was adjusted to 5.7 using alum. Instead of filtering, washing and drying each mixture as described in Example 3, these steps were omitted and the product was left in slurry form. A specimen fiberboard using each slurry product was then made by the fabrication procedure given in Example 2.

EXAMPLE 5

Enough corn starch suspension containing 40% solids was taken to equal approximately 1200 grams of dry solids. This slurry was heated to between 110° and 115° F., after which the pH was adjusted to 8.5 using 3% NaOH solution. Next, 30 grams of succinic anhydride (2½% by weight of the starch solids) was added in small doses while 3% NaOH solution was simultaneously added at such a rate as to maintain the pH between 7.5 and 8.5. After completion of the reaction (approximately 90 minutes), the slurry was divided into two parts. The pH of one part was adjusted to between 5.5 and 5.7 using a 20% sulphuric acid solution and the pH of the other part was also adjusted to between 5.5 and 5.7, but using alum. Each mixture was then filtered, washed with water, and oven dried at approximately 230° F. until the finished moisture content of each was approximately 10 to 12%. A specimen fiberboard was then made with each product.

For the fabrication of Fourdrinier fiberboard, 8.6 grams (dry basis) of the dry modified starch was added with 105 grams of mineral wool and 25.2 grams of clay into 5 liters of water and mixed in a Lightnin mixer for one half hour. Toward the end of the mixing, 40 ml. of 1% solution of Nalco 634 was added as a flocculent. Upon removal from the mixer, the water was screened from the solids by pouring the mass onto a laboratory hand sheet form. The mass was then pressed to a uniform thickness of ½ inch and oven dried.

EXAMPLE 6

Succinic anhydride and starch were reacted according to the reaction procedure given in Example 5. After completion of the reaction, the slurry was divided into two parts. The pH of one part was adjusted to 5.7 using sulphuric acid and the pH of the other part was adjusted to 5.7 using alum. Instead of filtering, washing and drying each mixture as described in Example 5, these steps were omitted and the product was left in slurry form. A specimen fiberboard was then made with each slurry product.

For the fabrication of the Fourdrinier fiberboard, 105 grams of mineral wool and 25.2 grams of clay were added to a slurry portion calculated to have 8.6 grams of starch on a dry basis. The modified starch, clay, wool and flocculent were added, thoroughly mixed, and the board was formed as in Example 5.

EXAMPLE 7

Succinic anhydride and starch were reacted according to the reaction procedure given in Example 5.

A specimen fiberboard using each product was then made by the same fabrication procedure as given in Example 5, except that 11.2 grams (dry basis) of dry modified starch was employed instead of 8.6 grams.

EXAMPLE 8

Succinic anhydride and starch were reacted according to the reaction procedure given in Example 5. However, instead of filtering, washing and drying each mixture as described in Example 5, these steps were omitted and each product was left in slurry form. A specimen fiberboard using each slurry product was then made by the fabrication procedure given in Example 6, except that the mineral wool and clay were added to a slurry portion calculated to have 11.2 grams of starch on a dry basis instead of 8.6 grams.

EXAMPLE 9

Succinic anhydride and starch were reacted according to the reaction procedure given in Example 5. A specimen fiberboard using each product was then made by the same fabrication procedure as given in Example 5, except that 14.0 grams (dry basis) of dry modified starch was employed instead of 8.6 grams.

EXAMPLE 10

Succinic anhydride and starch were reacted according to the reaction procedure given in Example 5. However, instead of filtering, washing and drying each mixture as described in Example 5, these steps were omitted and each product was left in slurry form. A specimen fiberboard using each slurry product was then made by the fabrication procedure given in Example 6, except that the mineral wool and clay were added to a slurry portion calculated to have 14.0 grams of starch on a dry basis instead of 8.6 grams.

The clay used in the preceding examples has the following chemical analysis (weight basis): 45.02% silica, 38.32% alumina, 1.66% titania, 0.06% lime, 0.14% magnesia, 0.13% soda, and 0.05% potash.

The mineral wool used in the preceding examples is known in the industry as slag wool. The size of the wool is defined as having a nodule size within 25 to 35% minimum above a ¾" screen and 15 to 20% maximum below a ¼" screen. The fiber diameter ranges from 2 to 40 microns. The chemical composition (weight basis) is 34 to 42% of silicon dioxide, 39 to 45% of calcium oxide, 8 to 14% of aluminum oxide, 2 to 8% of magnesium oxide, and trace elements such as iron, sulphur and manganese.

A comparison of the board fabricated in Examples 1 through 10 is given in the following table:

Table V

COMPARISON OF DRY vs. SLURRY FORM OF MODIFIED STARCH IN FOURDRINIER PROCESS

| Ex. | Modified Starch | Wt. Pct. | Form | Neutralizing Agent | Modulus of Rupture, psi |
|---|---|---|---|---|---|
| 1 | Maleate | 11.2 | Dry | $H_2SO_4$ | 149 |
|   |   |   |   | Alum | 171 |
| 2 | Maleate | 11.2 | Slurry | $H_2SO_4$ | 315 |
|   |   |   |   | Alum | 315 |
| 3 | Phthalate | 11.2 | Dry | $H_2SO_4$ | 318 |
|   |   |   |   | Alum | 300 |
| 4 | Phthalate | 11.2 | Slurry | $H_2SO_4$ | 332 |
|   |   |   |   | Alum | 348 |
| 5 | Succinate | 8.6 | Dry | $H_2SO_4$ | 279 |
|   |   |   |   | Alum | 270 |
| 6 | Succinate | 8.6 | Slurry | $H_2SO_4$ | 306 |
|   |   |   |   | Alum | 278 |
| 7 | Succinate | 11.2 | Dry | $H_2SO_4$ | 365 |
|   |   |   |   | Alum | 341 |
| 8 | Succinate | 11.2 | Slurry | $H_2SO_4$ | 348 |
|   |   |   |   | Alum | 348 |
| 9 | Succinate | 14.0 | Dry | $H_2SO_4$ | 412 |
|   |   |   |   | Alum | 376 |
| 10 | Succinate | 14.0 | Slurry | $H_2SO_4$ | 454 |
|   |   |   |   | Alum | 385 |

The foregoing results clearly show that Fourdrinier fiberboard manufactured using the reaction slurry, in lieu of the dry form, yields a product having superior strength qualities. Such result is observed for all three of the dibasic anhydrides disclosed, even though the percentage improvement decreases slightly for the higher order dibasic anhydrides.

From the foregoing, it will be seen that this invention is one well adapted to attain all the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

Having thus described out invention, we claim:

1. An improved fourdrinier process for the fabrication of fiberboard, the steps of said process comprising:
   (a) reacting ungelatinized starch and maleic anhydride in the amount of 0.05% to 6% anhydride based on dry starch to form a reaction slurry of modified starch while maintaining the pH of the reaction slurry in the range of 7 to 11;
   (b) mixing fibers with said reacted ungelatinized starch reaction slurry whereby said reacted starch forms 6 to 15% of the total solids on a dry weight basis;
   (c) forming the mixture of reaction slurry and fibers into a fiberboard; and
   (d) drying said fiberboard at a temperature above the gelatinization temperature of said reacted starch.

2. A fourdrinier fiberboard fabricated by the process comprising the steps of:
   (a) reacting ungelatinized starch and maleic anhydride in the amount of 0.05% to 6% anhydride based on dry starch to form a reaction slurry of modified starch while maintaining the pH of the reaction slurry in the range of 7 to 11;

(b) mixing fibers with said reacted ungelatinized starch reaction slurry whereby said reacted starch forms 6 to 15% of the total solids on a dry weight basis;

(c) forming the mixture of reaction slurry and fibers into a fiberboard; and (d) drying said fiberboard at a temperature above the gelatinization temperature of said reacted starch.

* * * * *